March 14, 1967
W. H. BUTTERBAUGH III  3,309,288
FRACTIONAL DISTILLATION OF A COMPONENT FROM A FEEDSTOCK
BY THE ADDITION OF HIGHER BOILER VAPORS TO THE REBOILER
Filed Nov. 2, 1962
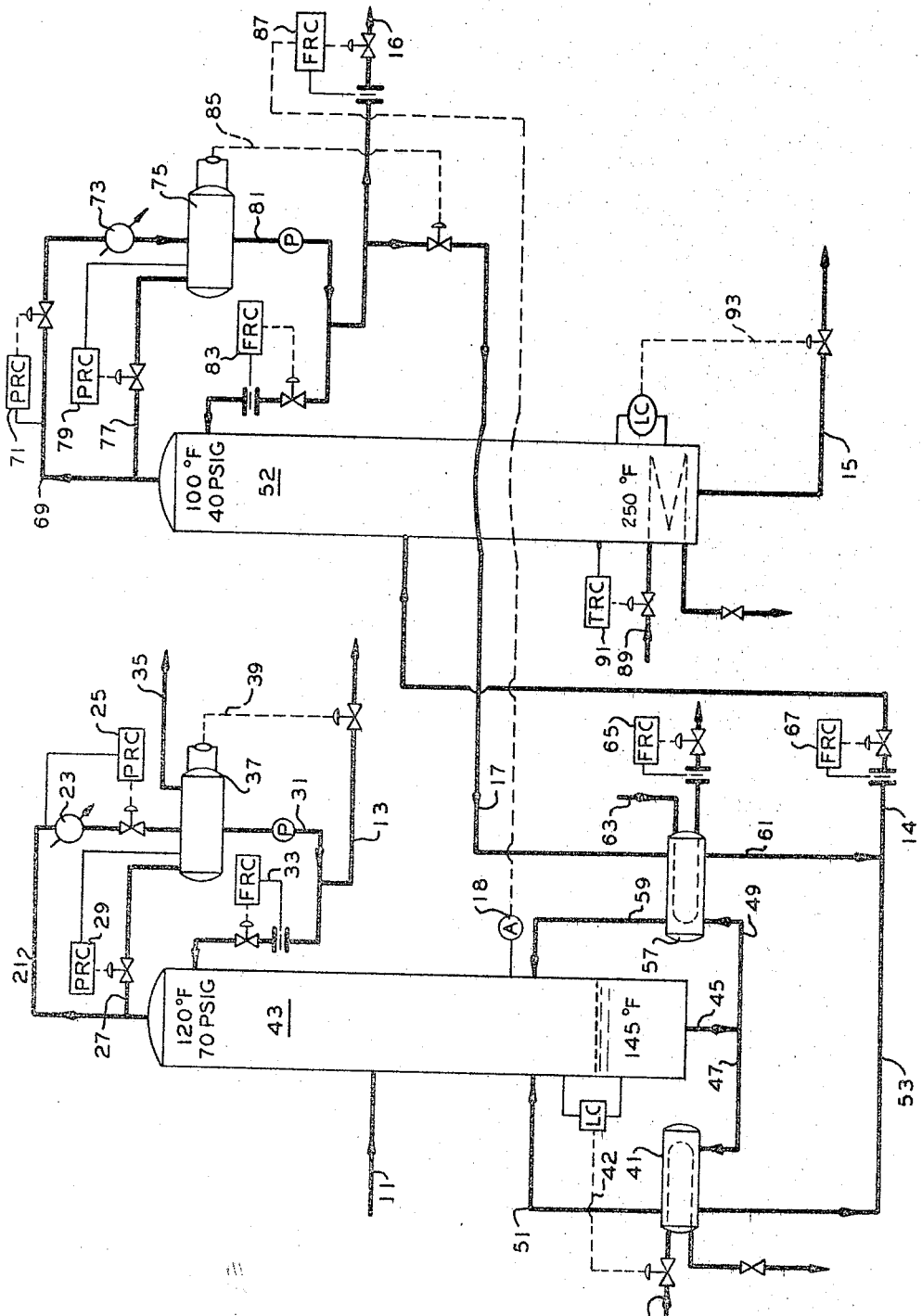
INVENTOR.
W. H. BUTTERBAUGH III
BY Young & Quigg
ATTORNEYS

United States Patent Office 3,309,288
Patented Mar. 14, 1967

3,309,288
FRACTIONAL DISTILLATION OF A COMPONENT FROM A FEEDSTOCK BY THE ADDITION OF HIGHER BOILER VAPORS TO THE REBOILER
William H. Butterbaugh III, Borger, Tex., assignor to Phillips Petroleum Company, a corporation of Delaware
Filed Nov. 2, 1962, Ser. No. 234,987
6 Claims. (Cl. 203—1)

This invention relates to operation of fractional distillation columns. In one aspect it relates to fractional distillation of feed stocks containing a thermally unstable component. In another aspect it relates to the upgrading by fractional distillation of a feed stock with respect to the content of a thermally unstable component, the feed stock originally containing a very high concentration of the unstable component. In yet another aspect it relates to a process for increasing the concentration of 1,3-butadiene in a feed stock containing as high as, for example, 95 percent of the butadiene by volume by fractional distillation without overheating the kettle content of the column, which overheating results in thermal instability of the butadiene.

Prior practice has been to provide an appreciable concentration of 2-butenes in the 1,3-butadiene stream charged to a fractional distillation column in order to provide sufficient vapor flow from the kettle to strip the 1,3-butadiene from the kettle contents. It is possible to strip the 1,3-butadiene from the kettle if sufficiently high kettle temperature is employed. However, such a temperature causes thermally unstable butadiene to polymerize and to deposit polymer on the reboiler coils and on all metal surfaces exposed to the high temperature kettle contents. Maintenance of such high kettle temperature is, obviously, undesirable.

I have found that upon distilling a feed stock of very rich 1,3-butadiene but containing a very, very low concentration of 2-butenes, the kettle temperature problem is solved by introducing a small stream of 2-butenes into the kettle of the still. This small stream of 2-butenes provides sufficient boilup to strip substantially all of the butadiene from the kettle. Upon holding the kettle temperature quite low, a substantial portion of the added 2-butenes passes out in the kettle product. This portion of 2-butenes is recovered in a subsequent operation as overhead product. It is at least a portion of this overhead product which is cycled to the kettle of the butadiene still. The amount of 2-butenes taken from the subsequent operation as product is somewhat less than that in the feed stock to the butadiene still because a small portion passes overhead from the butadiene still in the upgraded butadiene product.

An object of this invention is to provide a process for upgrading by fractional distillation the concentration of a thermally unstable component of a feed stock. Another object of this invention is to provide a process for upgrading by fractional distillation of a feed stock with respect to the content of a thermally unstable component, the feed stock originally containing a very high concentration of the unstable component. Yet another object of this invention is to provide a process for increasing the concentration of 1,3-butadiene in a feed stock containing as high as, for example, 95 percent 1,3-butadiene by volume by fractional distillation without overheating the kettle contents of the still, which overheating results in thermal instability of the butadiene. Yet other objects and advantages of this invention will be realized upon reading the following description which, taken with the attached drawing, forms a part of this specification.

The drawing illustrates, in diagrammatic form, an arrangement of apparatus parts for carrying out the process of this invention.

In the drawing, reference numerals 43 and 52 identify successively operated fractional distillation columns. A charge stock rich in 1,3-butadiene and containing only a very small content of 2-butenes and other components is charged to column 43 through a conduit 11. Overhead vapors are withdrawn from the column through a conduit 21, provided with a condenser 23. Pressure is maintained in column 43 by use of a pressure recorder controller 25 as illustrated. A by-pass conduit 27 connecting conduit 21 with an accumulator 37 is provided with a pressure recorder controller 29 for regulating flow of vapor through conduit 27 in response to pressure in the accumulator. A conduit 35 communicates with the accumulator for exit of uncondensed gases therefrom. Conduit 31 passes condensate, a portion of which passes on to the fractionator 43 as reflux while the remainder passes through a conduit 13 as the upgraded butadiene product of the process. A flow recorder controller 33 is provided in conduit 31, as illustrated, for regulation of the rate of flow of reflux. A level controller 39 regulates the rate of withdrawal of the butadiene product in response to level of the condensate in accumulator 37.

A reboiler 41 receives kettle liquid by way of conduits 45 and 47, vaporizes this liquid and the vapor returns to the kettle by way of a conduit 51. Steam is admitted to this reboiler by way of a conduit 55 with the regulation of the rate of flow of steam being controlled by a level controller 42 in response to the level of kettle liquid. A second reboiler 57 is provided and this reboiler receives kettle liquid by way of conduits 45 and 49 with heated liquid returning to the kettle by way of a conduit 59. Kettle products leave reboiler 41 by way of a conduit 53 and reboiler 57 by way of a conduit 61. These streams from conduits 53 and 61 flow through a conduit 14 as feed material to the second of the series of distillation columns.

This second distillation column, 52, is provided with an overhead vapor line 69 which, in turn, is provided with a pressure recorder controller 71 for pressure maintenance in this column. A condenser 73 condenses overhead vapor with the condensate passing on to an accumulator vessel 75. A by-pass conduit 77 communicates conduit 69 with the accumulator and this by-pass conduit is provided with a pressure recorder controller 79 which regulates the rate of flow of by-pass vapor in response to pressure within the accumulator. Condensate passes from the accumulator through a conduit 81, a portion passing on into the column 52 as reflux with the remainder passing through a conduit 16 as product. A flow recorder controller 83 is provided in conduit 81 adjacent the fractionator for regulation of the rate of flow of reflux thereto. A flow recorder controller 87 regulates the rate of flow of product condensate from accumulator 75 through conduit 16.

A conduit 17 communicates conduit 16 upstream of the flow recorder controller 87 with the reboiler vessel 57. This conduit 17 is provided for the passage of a controlled volume of condensate from conduit 16 into the reboiler 57 for providing boilup vapors for column 43. A level controller 85 regulates the rate of flow of this condensate through conduit 17 to reboiler 57.

A conduit 15 is provided for withdrawal of kettle contents from fractionator 52, the flow of which contents is regulated by a level controller 93 as illustrated. Reboiling heat is provided in fractionator 52 by passing steam through a conduit 89, the flow of which is regulated by a temperature recorder controller 91 responsive to temperature in the kettle section of this column.

Heat is added to the reboiler 57 by, in this particular case, passage of a stream of hot furfural from a source, not shown, through a conduit 63. The flow of this hot furfural is regulated by use of a flow recorder controller 65 as illustrated. The rate of withdrawal of final kettle product from fractionator 43 is regulated by a flow recorder controller 67 provided in conduit 14 as illustrated.

An analyzer, such as an ultraviolet analyzer or a chromatographic analyzer, 18, is provided as illustrated. In one instance a chromatographic analyzer receives a sample of vapor from the fifth tray from the bottom of the column and analyzes for butadiene content. This analyzer 18 communicates with the flow recorder controller 87 which regulates the withdrawal of the product condensate stream through conduit 16. The flow recorder controller 87 is, of course, provided with a set point needle which is set for the production of a given and predetermined volume of liquid flow through conduit 16. The analyzer 18 then resets the set point needle in response to the butadiene content in the vapor phase on the fifth tray of column 43.

This analyzer operates in the following manner. When the butadiene content is low in the vapor phase on the fifth tray, then the analyzer resets controller 87 to open its valve to allow greater flow through conduit 16. When there is sufficiently great flow through conduit 16, the level of condensate in accumulator 75 drops and the level controller 85 then throttles or even closes off the valve conduit 17 to restrict the flow of condensate to reboiler 57. If the butadiene content rises on the fifth tray, the analyzer begins cutting back on the flow through conduit 16 by way of resetting the set point of the flow controller 87, thus causing the liquid level in accumulator 75 to rise. This rise in level then actuates the level controller 85 for opening the valve in conduit 17, thus increasing the rate of flow of condensate to the reboiler 57.

The condensate from accumulator 75, which flows by way of conduit 17 into the reboiler 57, is the 2-butenes-rich stream which is used for boilup purposes in fractionator 43. This stream enters reboiler 57 and mixes with the kettle liquid which is heated by the hot furfural stream from conduit 63. The 2-butenes vaporize and these vapors strip butadiene from the reboiler liquid. The vapors flow through conduit 59 and enter the kettle section of fractionator 43, thereby providing boilup heat for the column. The result is, butadiene is well removed from the kettle contents in this column. Thus, as mentioned above, when the butadiene content on the fifth tray is low, there is not appreciable butadiene in the kettle liquid. In this case the flow control valve in conduit 16 is opened and the valve in conduit 17 is closed with the result that the flow of recycle 2-butenes is closed off or at least throttled. This flow remains closed off or throttled until there is at least some increase in the butadiene content of the vapors on the control tray. When the butadiene content of the vapors increases somewhat, the 2-butenes flow through the conduit 17 is increased and boilup vapors are provided for carrying these butadiene vapors up the column for their recovery in the overhead product therefrom.

Thus, by providing this return flow of 2-butenes, the butadiene is nearly completely removed from the kettle contents of this column. In this manner the temperature of the kettle contents is maintained relatively low and yet the butadiene is efficiently stripped from the kettle liquid.

In one instance the kettle temperature in column 43 is maintained at a temperature of about 145° F. while the top temperature is about 120° F. with a top column pressure of about 70 p.s.i.g. (pounds per square inch gauge).

Fractionator 52 operates on the kettle product from column 43 and this column 52 is for the express purpose of removing the product known in the art as the oils from such materials as the 2-butenes which have further use in the production of butadiene. In the instance mentioned, the kettle temperature in column 52 is maintained at about 250° F. while the top temperature is about 100° F. with a top column pressure of about 40 p.s.i.g.

The chromatographic analyzer employed in this instance has a control range of from about 0 to 60 mol percent butadiene and the operation is controlled so as to maintain about 10 to 12 mol percent of 1,3-butadiene at the control point. This concentration of butadiene is ordinarily present in the vapor on the fifth tray.

As an illustration of the operation of this process, the following tabulation gives the analysis of several streams of materials in process and several product streams in terms of liquid volume percent of the several components.

| Component | Steam No. | | | | |
|---|---|---|---|---|---|
|  | 11 | 13 | 14 | 15 | 16, 17 |
|  | Liq. Vol. Percent | Liq. Vol. Percent | Liq. Vol. Percent | Liquid Percent | Liq. Vol. Percent |
| Iso-butane | .2 | .14 | 2.0 | ---------- | 3.4 |
| 2-butene, trans | 1.0 | .18 | 26.8 | ---------- | 45.9 |
| 2-butene, cis | .2 | ---------- | 6.5 | ---------- | 11.2 |
| 1,3-butadiene | 96.1 | 99.66 | 1.7 | ---------- | 2.9 |
| Acetylenes | .6 | .02 | 18.8 | ---------- | 32.2 |
| Oils (C₅+) | 1.9 | ---------- | 44.2 | ---------- | 4.4 |
| Total | 100.0 | 100.0 | 100.0 | ---------- | 100.0 |
| Gal. per Hr. | 4,580 | 4,414 | 206 | ¹ 85.8 | ² 80 |

¹ This product is substantially C₆ and higher boiling oils.
² 40 gallons per hour of the condensate from accumulator 75 are passed through conduit 17 to heater 57 for boilup purposes in column 43, leaving 80 gallons per hour of final product.

It is noted from this tabulation that the charge stock contained a very small proportion of isobutane, 1 percent of 2-butene, trans, and 0.2 percent 2-butene, cis. There is a small volume of acetylenes and about 1.9 volume percent of oils which were of the nature of C₅'s and higher boiling. The 1,3-butadiene content was 96.1. Thus, from this high butadiene content it will be realized that the removal of substantially all of this valuable product from the kettle contents of a fractionator operating on such a feed stock is a difficult problem. In the operation of column 43, the butadiene content is increased from 96.1 percent in the feed stock to 99.66 percent in the condensate product withdrawn through conduit 13. The 2-butenes rich product flowing through conduits 16 and 17 contains 45.9 percent of trans-2-butene and 11.2 percent of cis-2-butene. Thus, this relatively large concentration of the 2-butenes provides the boilup and vapor flow in fractionator 43 as hereinabove explained.

While certain embodiments of the invention have been described for illustrative purposes, the invention obviously is not limited thereto.

That which is claimed is:

1. A method for the concentration by fractional distillation of 1,3-butadiene from a feed stock rich in 1,3-butadiene and having a narrow boiling range without overheating the kettle product in process comprising introducing said feed stock into a fractional distillation column, and fractionally distilling said feed stock by adding reboiling heat to the kettle section of the column and refluxing the head section of the column, adding to the kettle section a component which is also a component of said feed stock and which has a boiling point slightly higher than 1,3-butadiene, vaporizing at least a portion of the added component in an amount sufficient to increase the flow of vapors of the added component and 1,3-butadiene up the column and reduce the concentration of 1,3-butadiene in the kettle material, removing this latter material lean in 1,3-butadiene as a kettle product, and removing an overhead product having an increased concentration of 1,3-butadiene as product of the operation.

2. A method in accordance with claim 1 wherein by vaporizing a portion of the added component the remaining portion of added component remains in the kettle product, separately distilling said kettle product for production of a second kettle product and a second overhead product containing said added component and returning at least a portion of said second overhead product to the kettle section of said column as the added feed stock component.

3. A method for upgrading the concentration of 1,3-butadiene of a feed stock comprising very minor amounts of isobutane, 2-butene, trans, 2-butene, cis, acetylenes and oils of $C_5+$ and a very major amount of 1,3-butadiene, comprising subjecting said feed stock to fractional distillation in a column by adding reboiling heat and reflux thereto, said reboiling heat being added to the operation at a temperature below the temperature at which said butadiene becomes undesirably unstable, introducing a material comprising 2-butenes to the kettle section of the operation and vaporizing a portion of this latter added stock to increase vapor flow and sweep vapors of said butadiene up the column, and withdrawing an overhead product of increased butadiene content and a kettle product containing a very minor concentration of said butadiene.

4. A system comprising, in operable combination, first and second fractional distillation columns, each column having a feed inlet and an overhead vapor outlet conduit; a condenser and an accumulator in the vapor outlet conduit of the second column; means for passage of liquid reflux from said accumulator to the second column; first and second reboiler conduits connecting the kettle section of said first column with said first column at levels above but near said kettle section; first and second reboiler vessels in said first and second reboiler conduits, respectively; separate means for adding heat to said first and second reboiler vessels; a condensate flow conduit provided with a motor valve and connected between said accumulator and said second reboiler vessel; a condensate outlet conduit provided with a flow rate controller and leading from said accumulator to a point of disposal; an analyzer connected to the interior of said first column at a predetermined level, said analyzer being connected to said flow rate controller and adapted to reset the set point thereof; a liquid level controller in said accumulator, said liquid level controller being connected to said motor valve and adapted to actuate said motor valve in response to liquid level in said accumulator; and means for passage of bottoms product from said reboiler vessels to the inlet of said second column.

5. A system comprising, in operable combination, first and second fractional distillation columns, each column having a feed inlet and an overhead vapor outlet conduit; a condenser and an accumulator in the vapor outlet conduit of the second column; means for passage of liquid reflux from said accumulator to the second column; a condensate flow conduit provided with a motor valve and connected between said accumulator and the kettle section of said first column; a condensate outlet conduit provided with a flow rate controller and leading from said accumulator to a point of disposal; an analyzer connected to the interior of said first column at a predetermined level, said analyzer being connected to said flow rate controller and adapted to reset the set point thereof; a liquid level controller in said accumulator, said liquid level controller being connected to said motor valve and adapted to actuate said motor valve in response to liquid level in said accumulator; and means for passage of bottom product from said kettle section of said first column to the inlet of said second column.

6. A method for the concentration by fractional distillation of a first component from a feed stock rich in said first component and containing other components boiling at slightly higher than the boiling point of said first component and higher boiling oils, said feed being lean in said other components and higher boiling oils, comprising introducing said feed stock into a first fractional distillation column and fractionally distilling said feed stock therein by adding reboiling heat to the kettle section of said column and refluxing the head section of said column, adding to said kettle section a second component which is also a component of said feed stock and which has a boiling point slightly higher than the boiling point of said first component and being other than a desired overhead product component, vaporizing at least a portion of the thus added second component in an amount sufficient to increase vapor flow and sweep vapors of said first component up the column to reduce the concentration of said first component in the kettle product of said column, the remaining portion of said added second component remaining in the kettle product, withdrawing overhead product of increased concentration of said first component and a kettle product of reduced concentration of said first component, passing said kettle product to a second fractional distillation column and therein distilling said kettle product for the production of an overhead stream containing said added second component and a second kettle product, condensing at least a portion of said overhead stream and introducing the thus at least partially condensed overhead stream into an accumulator, withdrawing a first portion of the liquid from said accumulator as a second overhead product at a rate responsive to the concentration of said first component at a predetermined level in said first column, and passing at a rate responsive to the liquid level in said accumulator a second portion of the liquid from said accumulator to the kettle section of said first column as the source of said added second component.

References Cited by the Examiner
UNITED STATES PATENTS

| | | | |
|---|---|---|---|
| 2,371,860 | 3/1945 | Walls et al. | 203—49 |
| 2,465,047 | 3/1949 | Tooke et al. | 203—70 |
| 2,486,929 | 11/1949 | Dean | 203—70 |
| 2,709,678 | 5/1955 | Berger | 202—160 |
| 2,725,351 | 11/1955 | Grote | 202—160 |
| 2,868,701 | 1/1959 | Berger | 202—160 |
| 2,878,168 | 3/1959 | Tanner | 202—46 |
| 2,977,289 | 3/1961 | Kron | 202—160 |
| 3,000,794 | 9/1961 | Tschopp | 203—58 |
| 3,007,852 | 11/1961 | Hunter et al. | 202—46 |
| 3,085,153 | 4/1963 | Morgan | 203—3 |
| 3,115,445 | 12/1963 | Kleiss et al. | 202—160 |
| 3,232,850 | 1/1966 | Renberg et al. | 203—58 |

NORMAN YUDKOFF, *Primary Examiner.*

WILBUR L. BASCOMB, JR., M. H. SILVERSTEIN,
*Assistant Examiners.*